United States Patent
Kurtzberg et al.

(10) Patent No.: US 6,388,682 B1
(45) Date of Patent: May 14, 2002

(54) ADAPTIVE COMPUTER DISPLAY SCREEN WINDOW ACCOMMODATING USER OR HUMAN FACTOR INPUT

(75) Inventors: Jerome M. Kurtzberg; Menachem Levanoni, both of Yorktown Heights, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/271,768

(22) Filed: Mar. 18, 1999

(51) Int. Cl.[7] .............................................. G06F 3/00
(52) U.S. Cl. ...................... 345/764; 345/762; 345/700; 345/781; 345/803
(58) Field of Search ......................... 395/154; 345/335, 345/764, 762, 700, 781, 803; 341/175

(56) References Cited

U.S. PATENT DOCUMENTS

| | | | | |
|---|---|---|---|---|
| 5,481,664 A | * | 1/1996 | Hiroya et al. ................ | 395/154 |
| 5,604,860 A | * | 2/1997 | McLaughlin et al. ......... | 395/326 |
| 5,613,909 A | * | 3/1997 | Stelovsky ....................... | 463/1 |
| 6,104,334 A | * | 8/2000 | Allport ......................... | 341/175 |
| 6,115,040 A | * | 9/2000 | Bladow et al. .............. | 345/335 |

* cited by examiner

Primary Examiner—John Cabeca
Assistant Examiner—Mylinh Tran
(74) Attorney, Agent, or Firm—Whitham, Curtis & Christofferson, P.C.; Stephen C. Kaufman

(57) ABSTRACT

The invention monitors user edit actions to window properties, as the edit actions develop over some time period of a first computer operating session. The invention then creates a user profile reflecting such editing actions, as preparatory materials for instantiation of an instant window in a second operating session. The instant window, in turn, comprises a self-reflexive admixture which correlates to the user's specific window activity pattern and pertinent human factor rules.

10 Claims, 17 Drawing Sheets

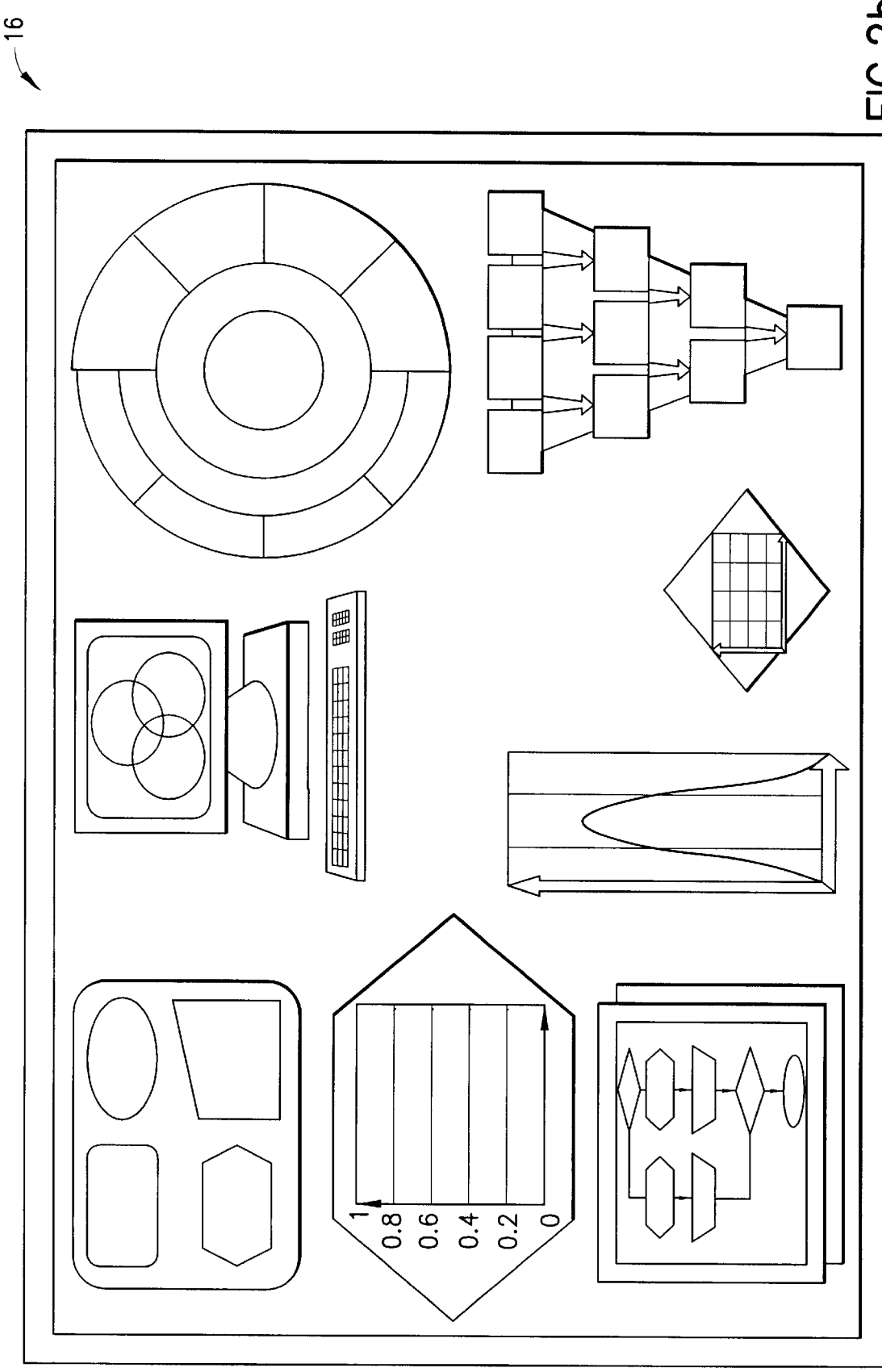

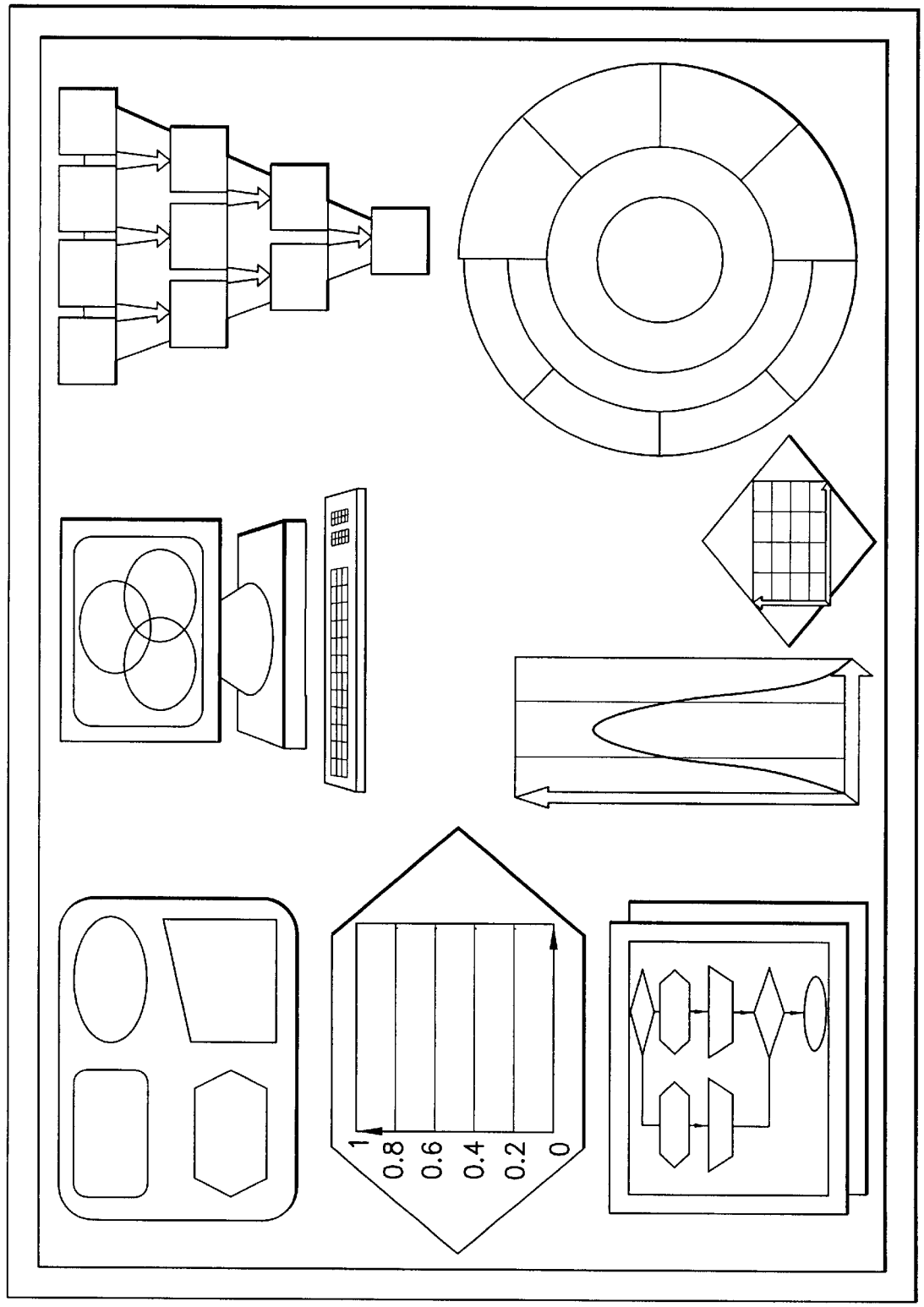

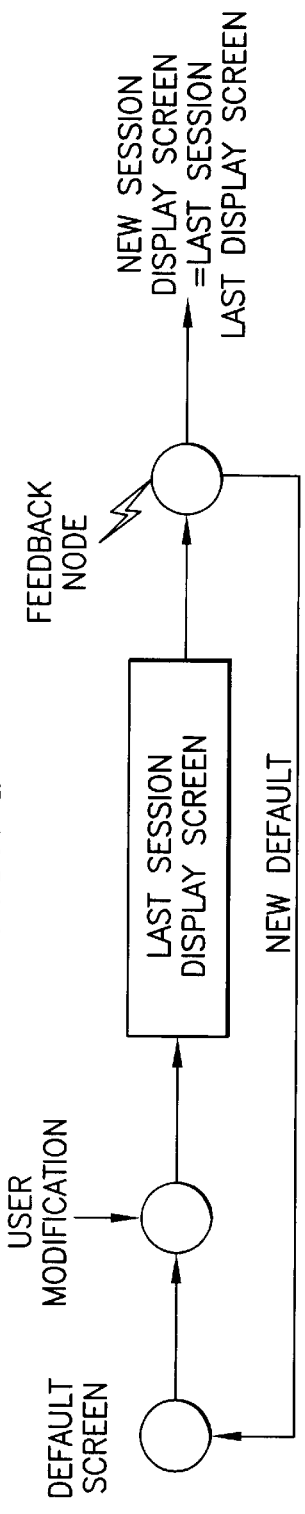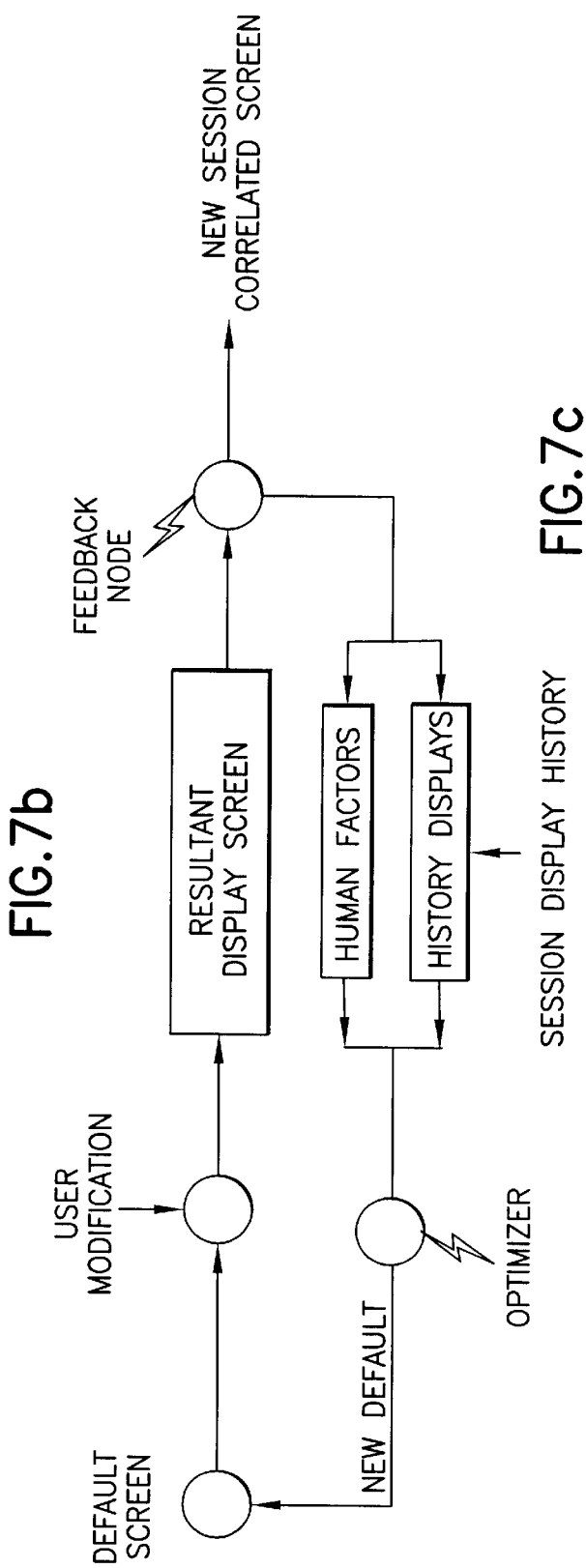
FIG.7a
FIG.7b
FIG.7c

ADAPTIVE COMPUTER DISPLAY SCREEN WINDOW ACCOMMODATING USER OR HUMAN FACTOR INPUT

CROSS-REFERENCE TO RELATED APPLICATION

This application is related to application Ser. No. 09/257,427 filed Feb. 26, 1999 by Levanoni and Kurtzberg. The entire disclosure of this application, which is copending and commonly assigned, is incorporated by reference herein.

FIELD OF THE INVENTION

This invention relates to a computer system and method for providing an adaptive computer display screen window.

INTRODUCTION TO THE INVENTION

A typical operation of a computer may include the following sequence of events.

The computer display screen presents to a user, upon the advent of a first operating session, a default display screen window.

The default display screen window may, or may not, depending upon a particular computer, accommodate computer generated human factor inputs and requirements. For example, FIG. 1A illustrates a default display screen window 10 which does not accommodate computer generated human factor inputs and requirements—which FIG. 1A is now instructively contrasted with FIG. 1B, numeral 12, which shows the same default display screen window as FIG. 1A, but with the manifest advantage of accommodating computer generated human factor inputs and requirements. Note, for example, the FIG. 1B human factor inputs based inter alia on the well known techniques of scaling, grouping, or location.

Thereafter, and within the first operating session, the user may generally edit the FIG. 1A default window (with or without the FIG. 1B computer generated human factor input), by at will e.g., enlarging or shrinking the window, dividing the screen into a plurality of independent windows, or changing at least one of color, font, or topological arrangement of the window(s) per screen (as shown in FIGS. 2A–D, discussed in detail, below).

As this editing action unfolds over time, instantaneous user edits generally vitiate previous edit actions. Accordingly, at the conclusion of the first operating session, the original FIG. 1A default display screen window has been superseded by an image that represents a users last edit action (FIG. 2D) re enlargement, shrinkage, color, font, etc. This last image, in turn, may or may not (depending on a particular computer system), be invoked at the beginning of a second operating session, in favor of the FIG. 1A default display screen window. In this connection, moreover, we note that in all cases, in the prior art, the computer may incorporate or accommodate computer generated human factor inputs or requirements of the type shown in FIG. 1B, but this action is independent of the user editing action(s) of the type shown in FIGS. 2A–D.

SUMMARY OF THE INVENTION

Our work seeks to further improve and refine this illustrative operation of a computer, by enabling it to efficiently and advantageously realize a new capability vis-a-vis the invocation of a computer display screen upon instantiation of an operating session.

In particular, our new capability may be realized in an invention, which in a first aspect, discloses a computer operated method comprising the steps of:

(1) ascertaining a property of a window to be displayed on a computer screen in a default condition during a first operating session;

(2) monitoring property changes prompted by inputs by a user to effect changes from the default condition of the window, thereby reflecting a user's specific window activity pattern developed during the first operating session;

(3) creating a first referent comprising a history of the step (2) window activity pattern;

(4) creating a second referent comprising human factor rules which are pertinent to a property of a window;

(5) creating a modified referent by actions comprising at least one of:

a) subjecting the first referent to constraints imposed by the second referent developed as a reflection of said user specific activity pattern during the first operating session;

b) subjecting the second referent to constraints imposed by the first referent developed as a reflection of said human factor rules pertinent during the first operating session; and c) simultaneously optimizing said first and second referents; and (6) using the modified referent for generating an instant window for display during a second operating session, which instant window has been adaptively modified from the default condition window so that it's properties correlate to the user's specific window activity pattern and the pertinent human factor rules.

The present invention, accordingly, if now set in apposition to the prior art described above, can be shown to manifest significant and advantageous differences. It is recalled that as editing actions unfold over time in the prior art, instantaneous edits generally vitiate previous edit actions, and, these actions are independent of human factor rule considerations.

The present invention, in sharp contrast to the prior art, monitors such edit actions (i.e., does not vitiate the edit, as information) to an end of creating preliminary materials comprising a user profile reflecting user editing action developed during at least a finite portion of an operating session. Then, an instant display can be presented during a second operating session, which instant display is cognizant and reflective of user specific window subjectivity, as developed or weighted over time, and, which self-reflexively informs (or is informed by) human factor rule considerations (in at least a three-fold way, as defined above, i.e., step (5) a, b, c).

Preferably, step (1) of the method includes ascertaining a status of the default condition by registering at least one of font, color, location, shape, and content of the default window.

Step (2) may comprise monitoring property changes prompted by the user throughout the entire first operating session.

Step (3) of the method may include creating the first referent by (1) determining frequency-of-use of user window activity; or, (2) computing the maximum likelihood expected values for the properties of user window activity; or, (3) using the last image pattern displayed by the user in that operating session.

Preferably, step (3) includes creating a first referent comprising a user window activity history developed over several operating sessions.

Preferably, step (4) includes creating the second referent by optimizing a screen layout utilizing optimization via human factor rules using a method of Lagrangian multipliers for handling the constraints imposed by the user's activity pattern.

In a second aspect, the present invention discloses a program storage device readable by machine, tangibly embodying a program of instructions executable by the machine to perform method steps for providing an adaptive window display, the method comprising the steps of:

(1) ascertaining a property of a window to be displayed on a computer screen in a default condition during a first operating session;

(2) monitoring property changes prompted by inputs by a user to effect changes from the default condition of the window, thereby reflecting a user's specific window activity pattern developed during the first operating session;

(3) creating a first referent comprising a history of the step (2) window activity pattern;

(4) creating a second referent comprising human factor rules which are pertinent to a property of a window;

(5) creating a modified referent by actions comprising at least one of:
   a) subjecting the first referent to constraints imposed by the second referent developed as a reflection of said user specific activity pattern during the first operating session;
   b) subjecting the second referent to constraints imposed by the first referent developed as a reflection of said pertinent human factor rules during the first operating session; and
   c) simultaneously optimizing said first and second referents; and (6) using the modified referent for generating an instant window for display during a second operating session, which instant window has been adaptively modified from the default condition window so that it's properties correlate to the user's specific window activity pattern and the pertinent human factor rules.

In a third aspect, the present invention discloses a computer system suitable for providing an adaptive computer screen window display, the system comprising:

(1) CPU means for ascertaining a property of a window to be displayed on a computer screen in a default condition during a first operating session;

(2) CPU means for monitoring property changes prompted by inputs by a user to effect changes from the default condition of the window to reflect a user's specific window activity pattern during the first operating session;

(3) CPU means for creating a first referent comprising a history of the window activity pattern;

(4) CPU means for creating a second referent comprising human factor rules which are pertinent to a property of a window;

(5) CPU means for creating a modified referent by actions comprising at least one of:
   a) subjecting the first referent to constraints imposed by the second referent developed as a reflection of said user specific activity pattern during the first operating session;
   b) subjecting the second referent to constraints imposed by the first referent developed as a reflection of said pertinent human factor rules during the first operating session; and
   c) simultaneously optimizing said first and second referents; and (6) CPU means for using the modified referent for generating an instant window for display during a second operating session, which instant window has been adaptively modified from the default condition window so that it's properties correlate to the user's specific window activity pattern and the pertinent human factor rules.

In a fourth aspect, the present invention discloses a computer system comprising:

1) an open loop structure comprising:
   a) a default screen node;
   b) a summing node;
   c) a first input vector derived from the default screen node for input to the summing node and comprising a computer display default screen from a preceding operating session;
   d) a second input vector to the summing node comprising a user generated display screen for input to the summing node during a current operating session; the summing node capable of receiving said first and second input vectors and outputting a first signal;
   e) a display processing module which receives the first signal and outputs a resultant display screen; and 2) a closed loop structure comprising a feedback loop which closes around the open loop structure by:
   a) sensing changes in a current display;
   b) remembering a history of resultant changes developed over a current operating session;
   c) modifying the history of resultant changes developed over the current session so that the history has adaptable changes informed by human factor constraints; or optimizing the current session screen layout via human factor rules, constrained by the user's activity pattern; and
   d) generating a display screen which can be correlated to the modified history of changes developed over the current operating session or correlated to the optimized session screen layout, for outputting to the default screen node a new default screen for presentation upon instantiation of a subsequent operating session.

BRIEF DESCRIPTION OF THE DRAWING

The invention is illustrated in the accompanying drawing, in which:

FIGS. 2A–E show a progression of user modified changes to the FIG. 1A default screen window, thereby effecting changes to the default condition of the window as developed over a first operating session, all in illustration of a first operational aspect of the present invention;

Figure 4A:
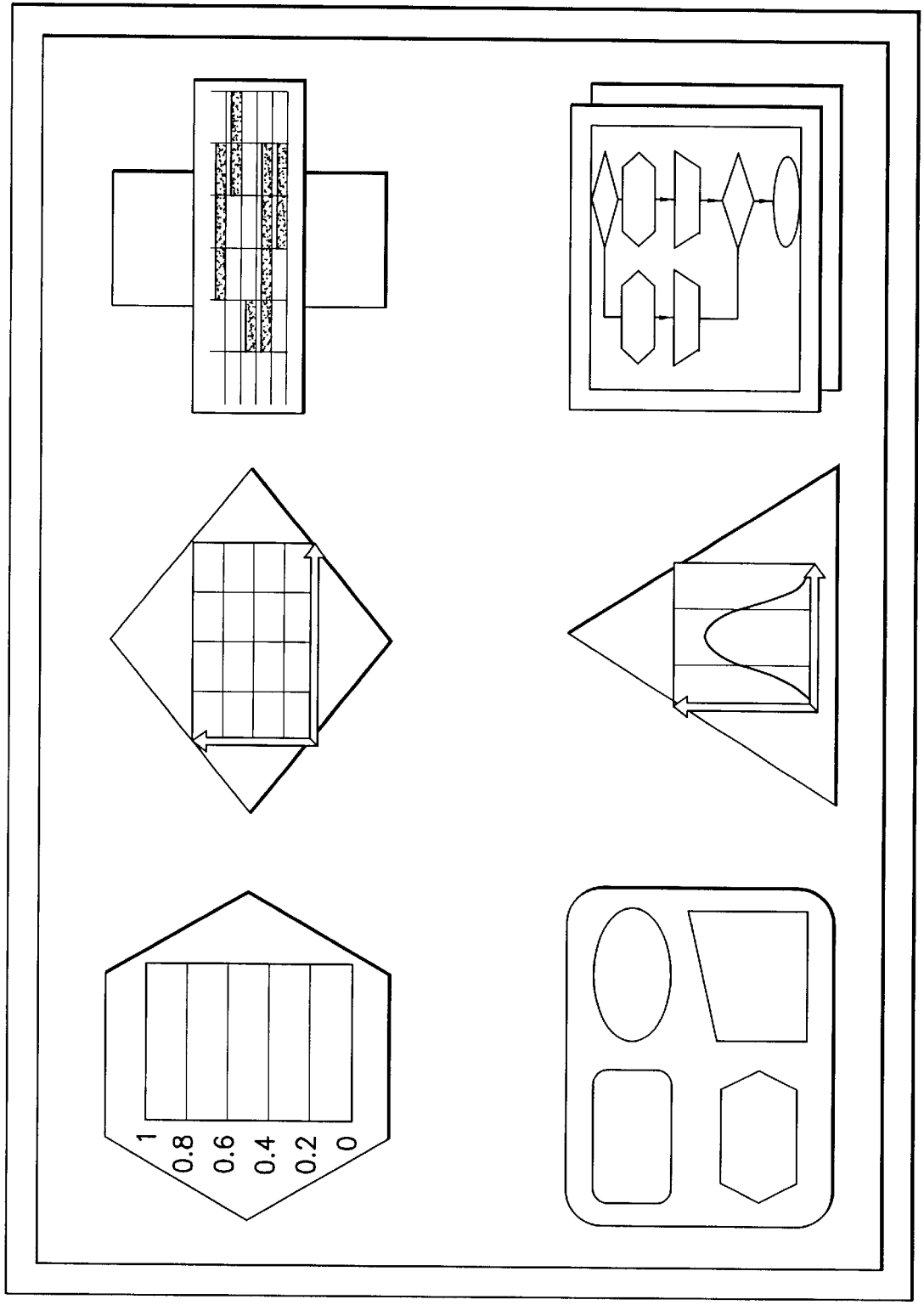
FIGS. 4A–F show a progression of windows illustrative of a second operational aspect of the present invention.
Figure 4B:
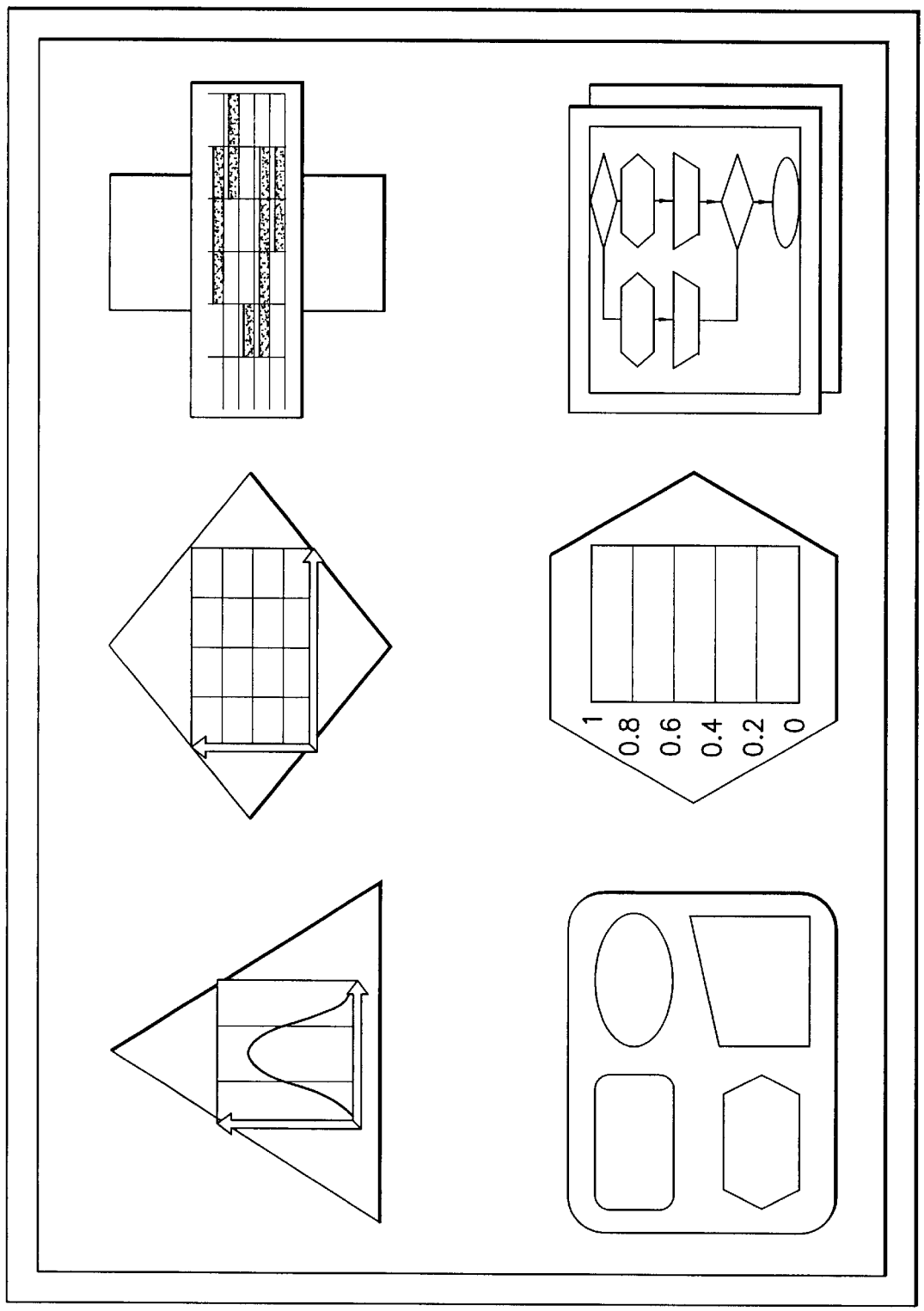
Figure 4C:
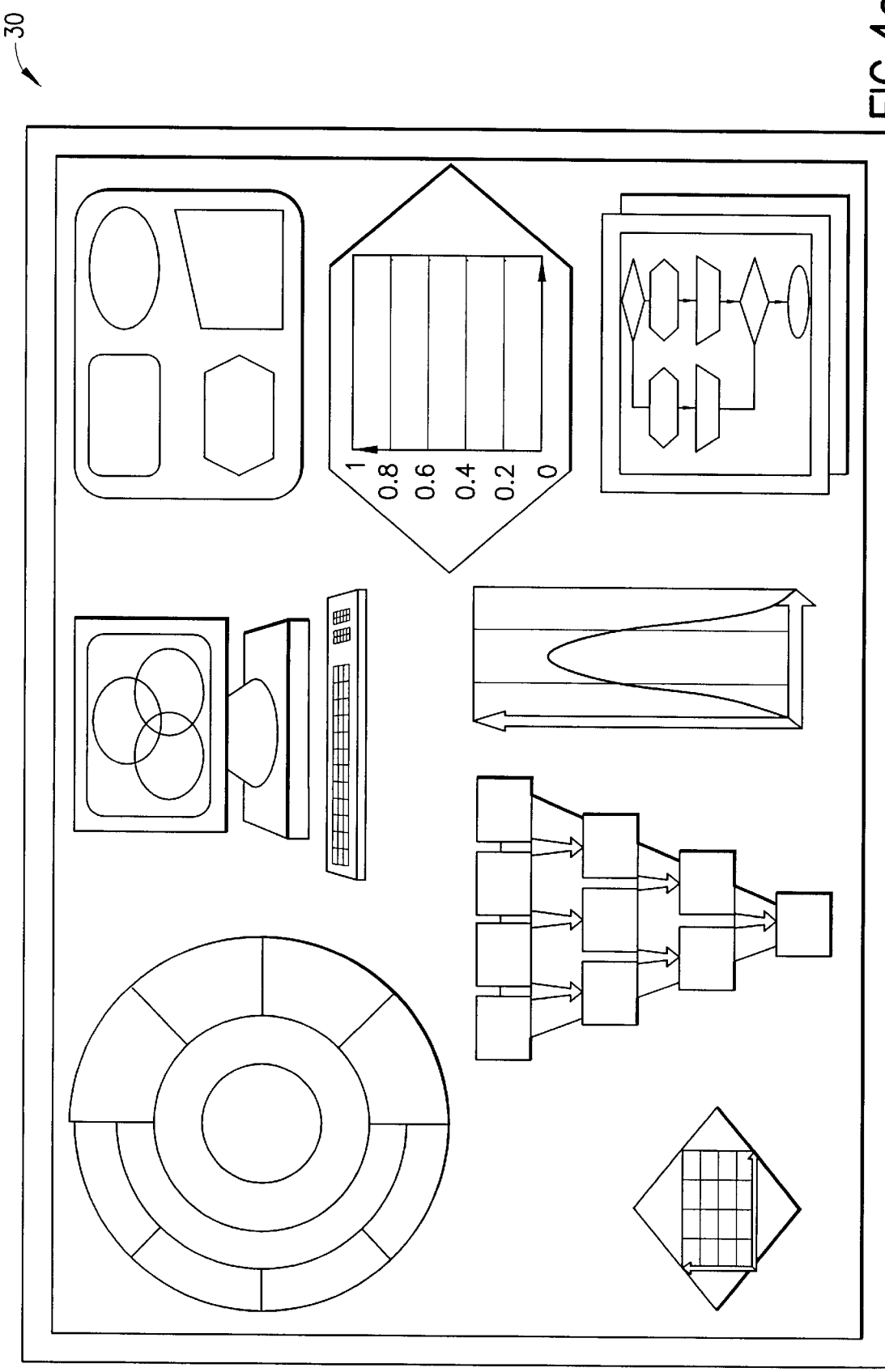
Figure 4D:
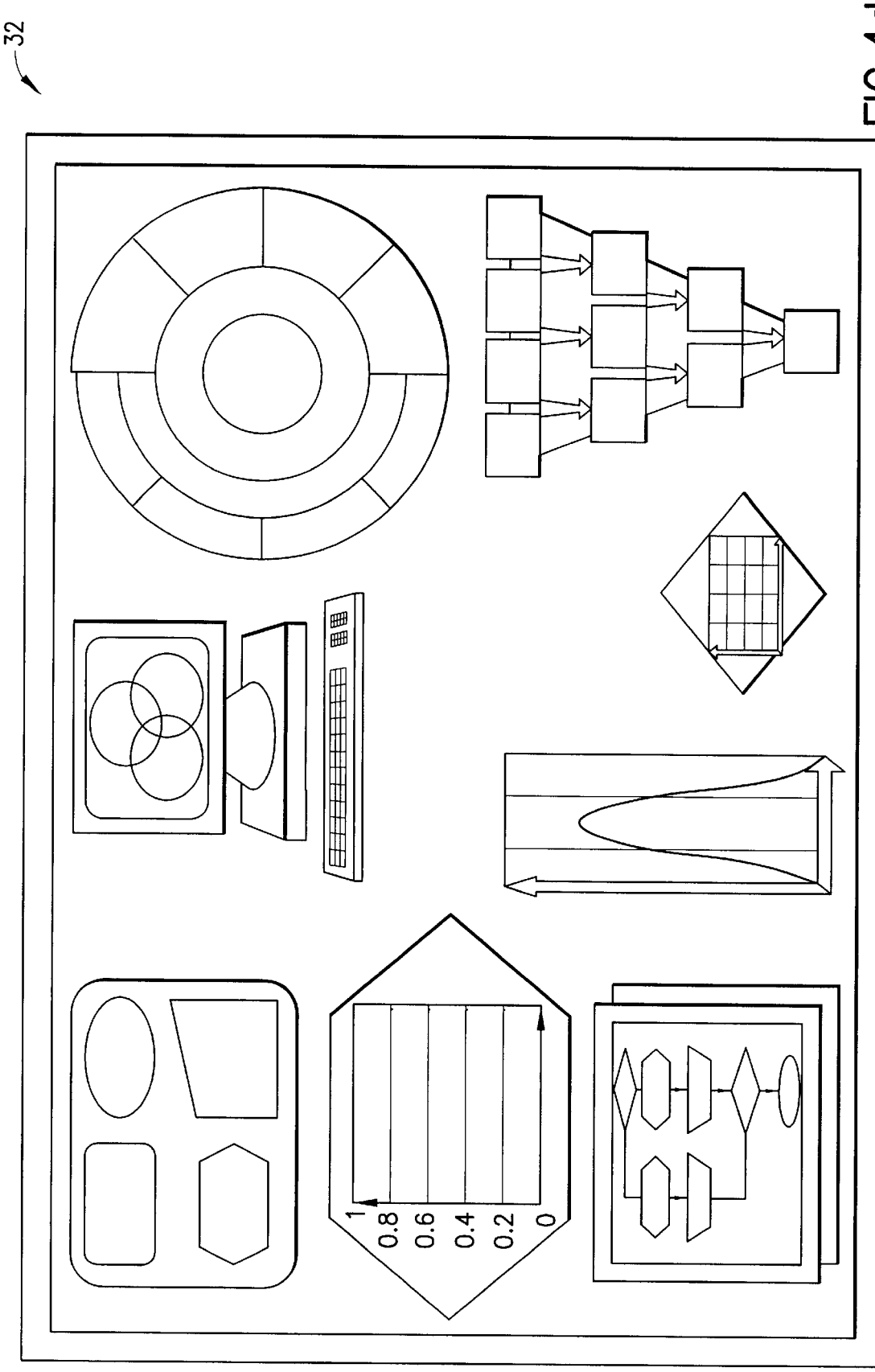
Figure 4E:
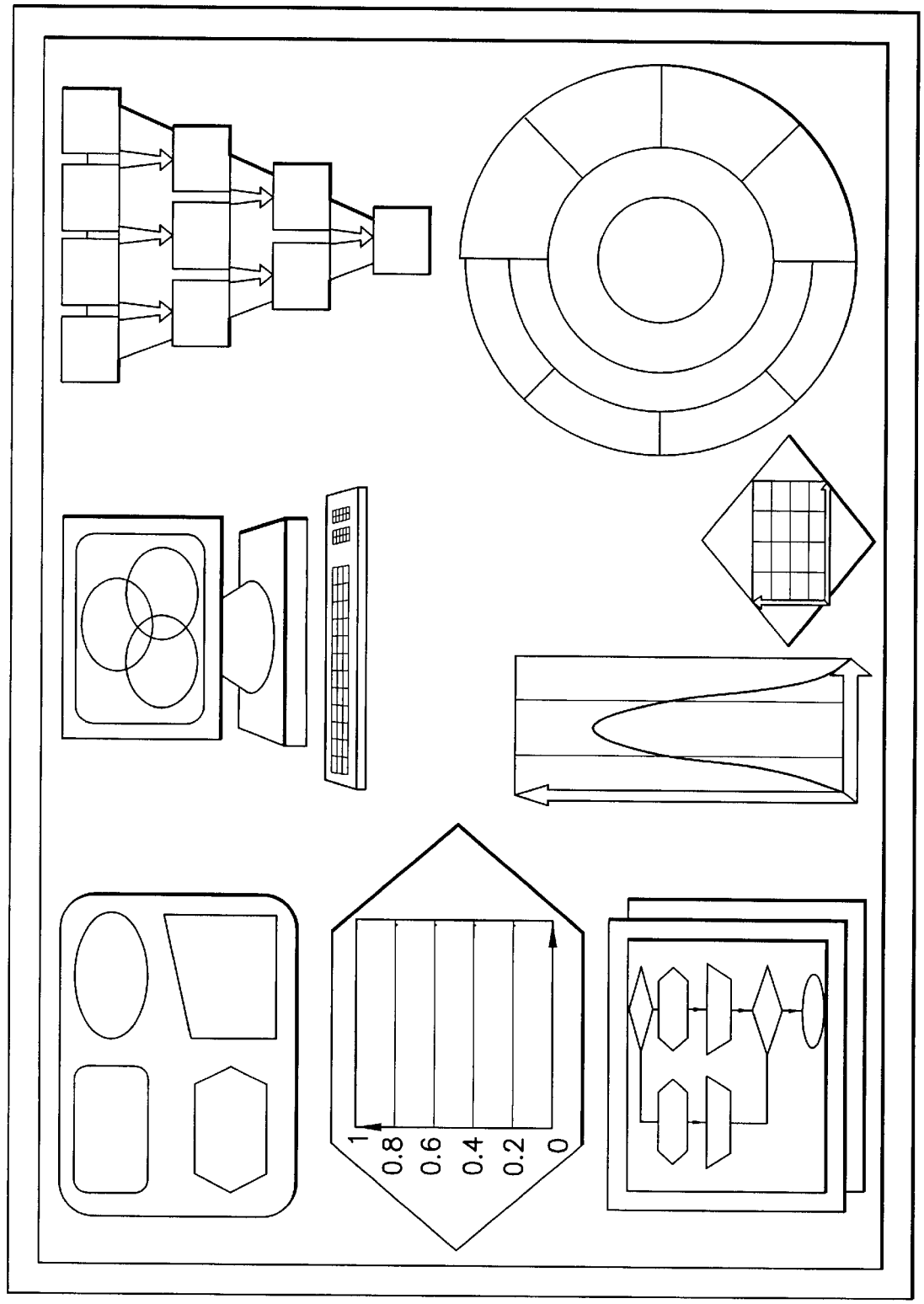
Figure 4F:
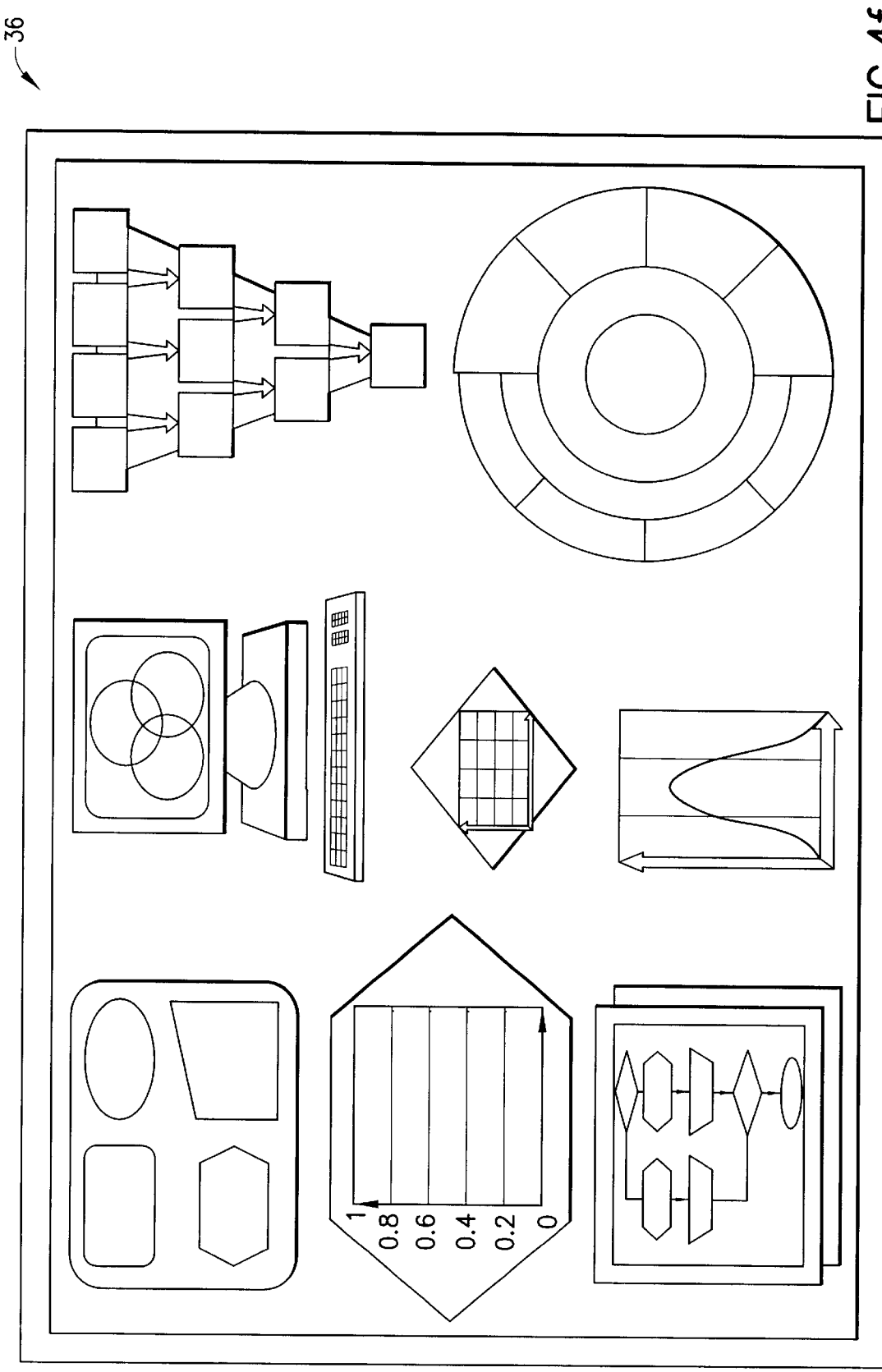
Figure 5:
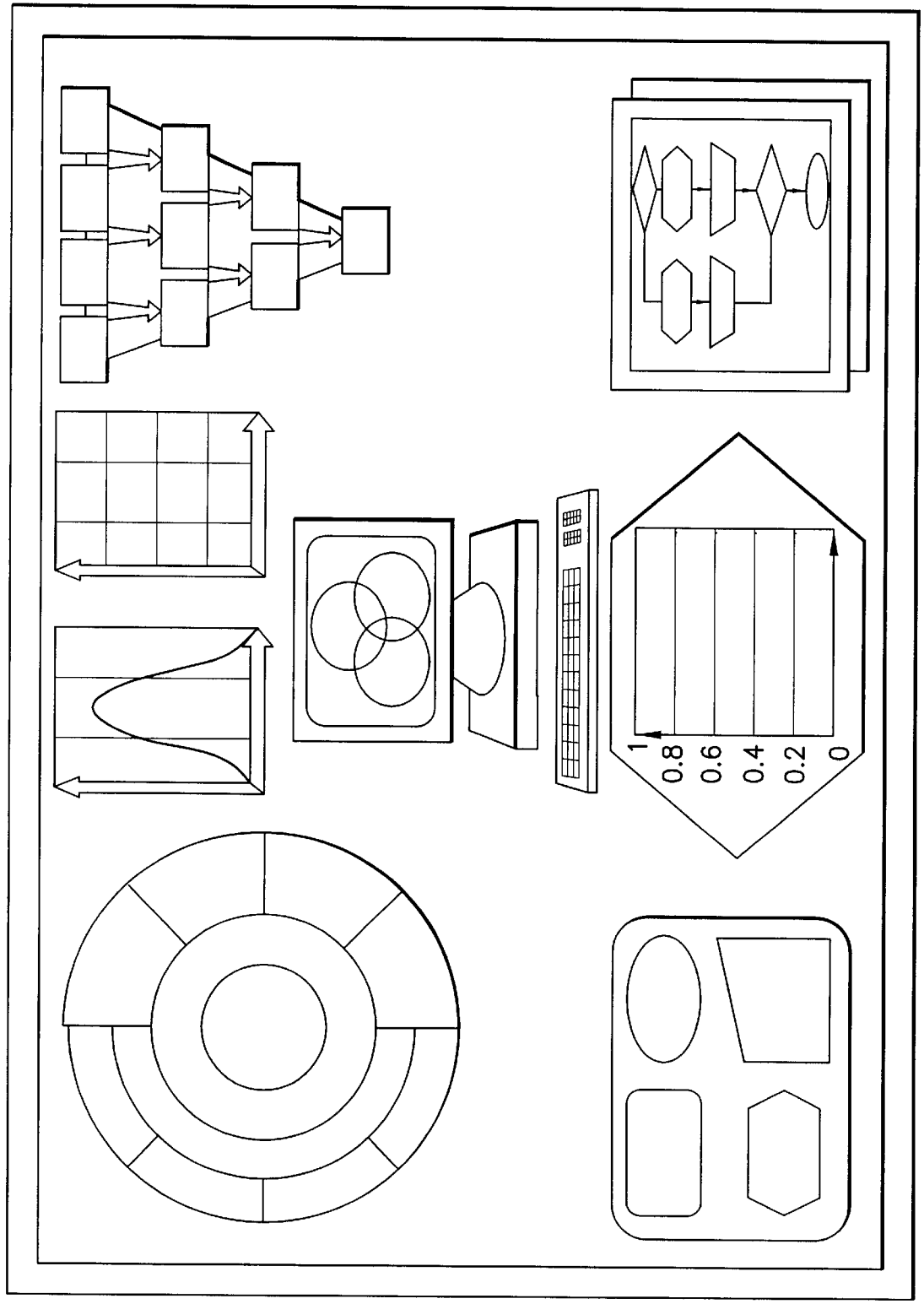
Figure 6:
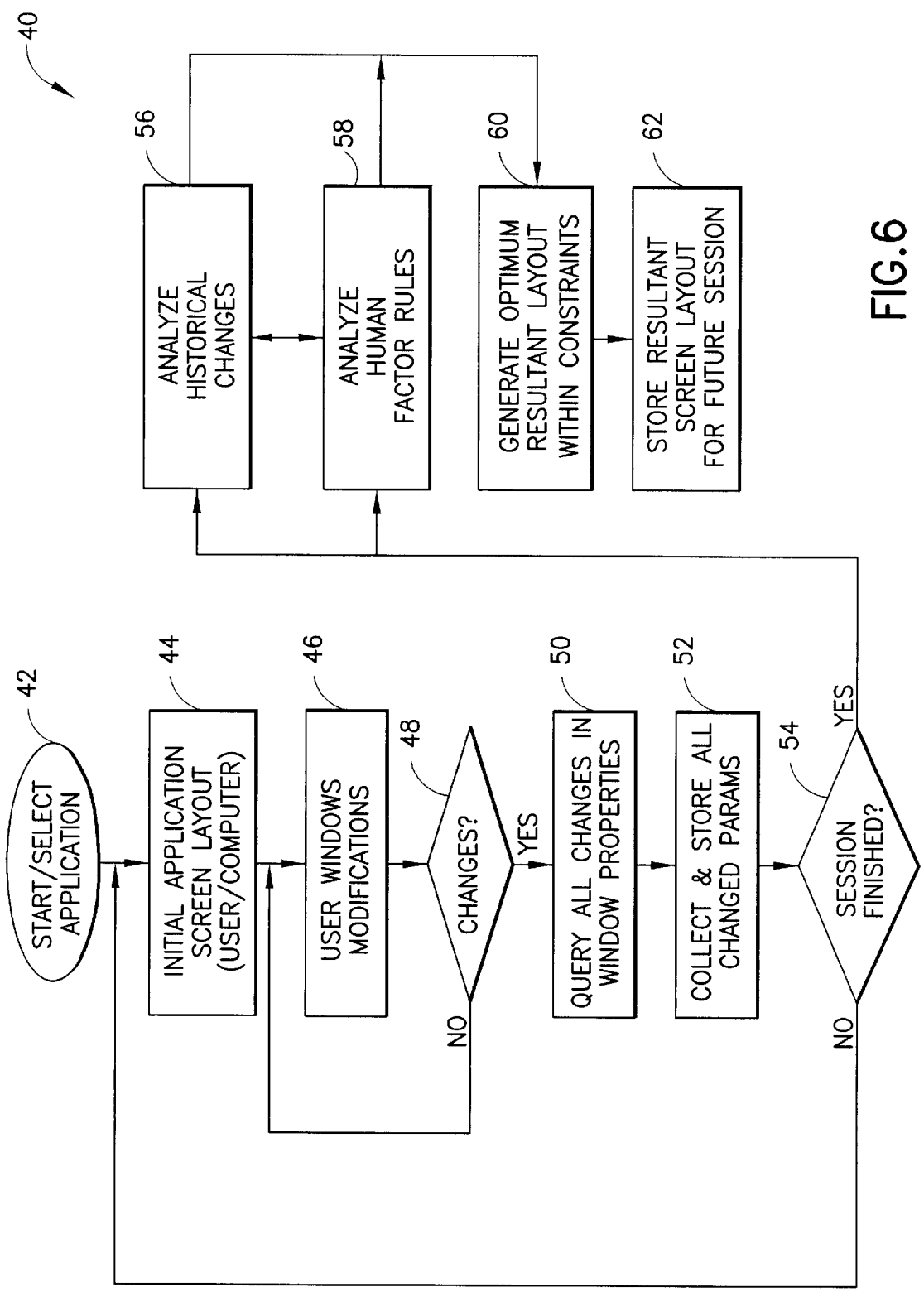

wherein human factor rules are primary in determination of a window to be displayed to a user;

FIG. 5 shows the fruition of the FIGS. 4A–F activity, in a form of a human factor optimized screen layout informed by user activity;

FIG. 6 shows an operational flowchart for one way of realizing the present invention; and FIGS. 7a and b show a feedback control system that heuristically represents one way of conceptualizing the prior art, while FIG. 7c shows a feedback control system that heuristically represents one way of conceptualizing the present invention.

DETAILED DESCRIPTION OF THE INVENTION

The invention is summarized above, and discloses a novel structure/interface for the management of information stored in computers. The detailed description proceeds by sequentially analyzing the invention in two of its operational-interrelated aspects or modes. In brief, a first operational aspect comprises modifying a user window activity by human factor rule considerations; and, a second inverse operational aspect comprises a human factor screen informed by user window activity.

First Operational Aspect of the Invention

In order to explicate the first operational aspect of the present invention, we return to FIG. 1A which shows a computer display screen window that represents a default for presentation during a first operating session. In the FIG. 1A default screen, the window pattern is selected based on a typical user in that particular area (business, industry, etc.).

Figure 1A:
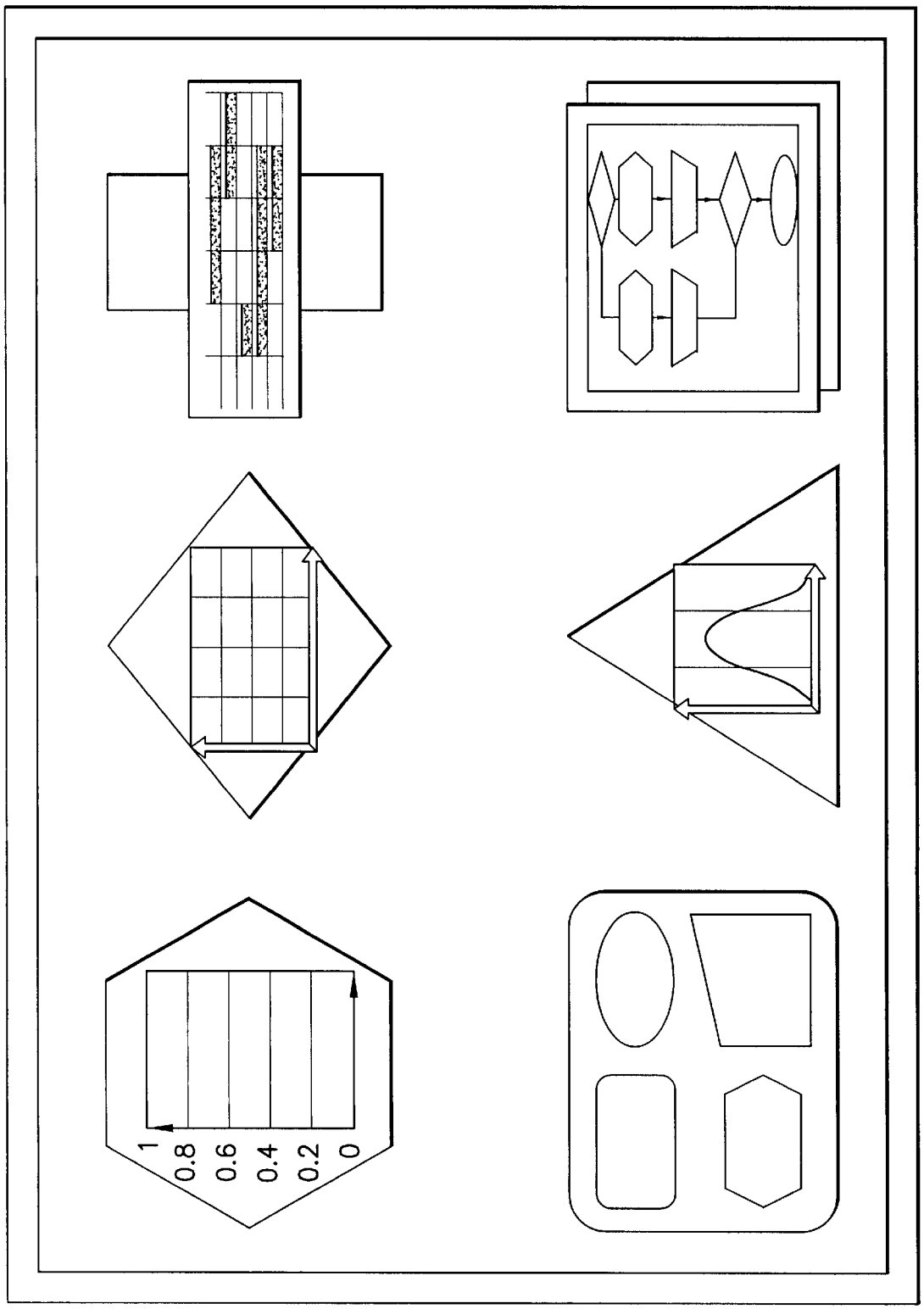
FIGS. 1A, B show respectively a computer display screen window that represents a default condition for presentation during a first operating session, without and with enhancement by human factor rule input.

FIG. 1A includes several columns of related subwindows. These windows capture all that the vast majority of a set of users require to perform a daily routine. A menu bar (not shown), may provide the user with additional capabilities to create/delete windows, import/export data, view data, save information to files or print them, save/retrieve previous layouts, execute commands automatically at prescribed times, display information in several formats, enable/disable specific actions, or access data generated by other users. On-line help may also be provided.

The user is now free to add, delete, or modify the FIG. 1A default pattern, as shown progressively in FIGS. 2a–d, numerals 14–20. Note here, in sharp contrast to the prior art, the present invention monitors the progression of such user modified changes to the FIG. 1A default window, and keeps track of user activity and the resulting window pattern developed over the first operating session, in order to create a first referent history.

Figure 2A:
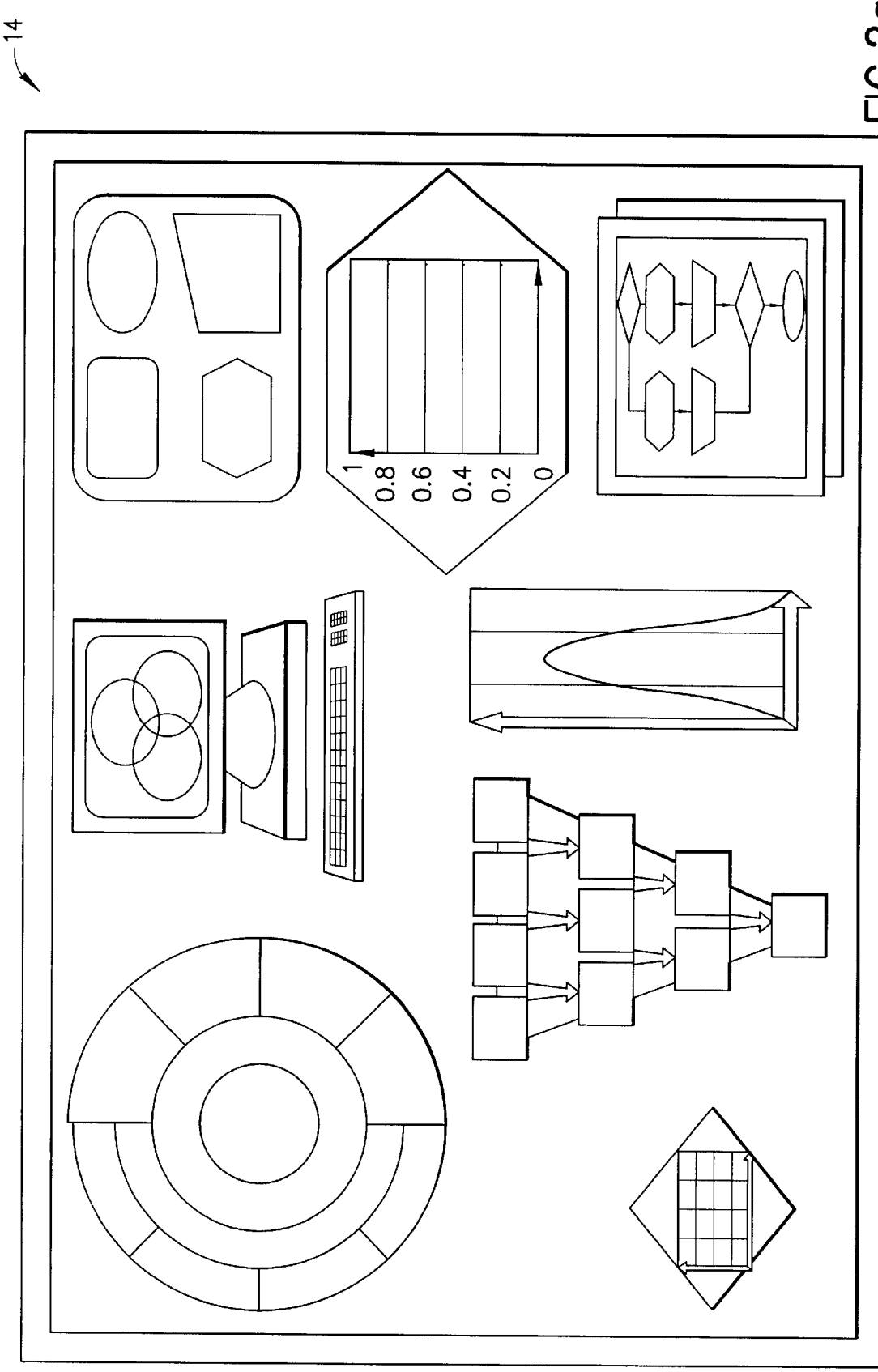

For example, FIG. 2a shows a first user modified screen layout, the FIG. 2a layout preserving some of the FIG. 1A default screen windows, while adding some new windows e.g., a circular icon, deleting some old windows, and rearranging the FIG. 1A topology.

FIG. 2b, in turn, shows a second user modified screen layout. Here, in particular, it may be discerned that the FIG. 2a right hand column windows have been transposed by the user, to the left side of the screen, while the circular window icon has been transposed to the right hand column.

Figure 2C:
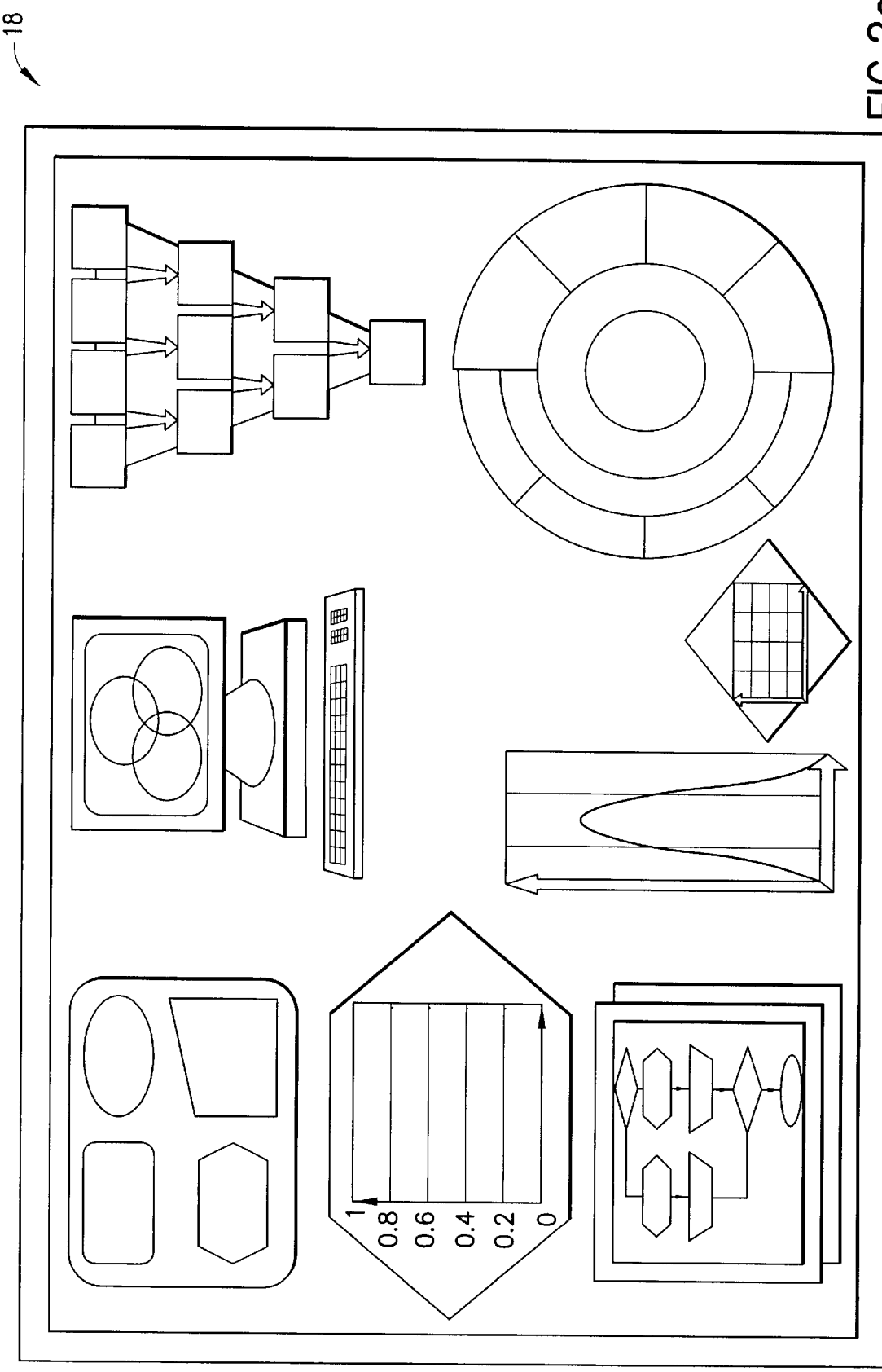

FIG. 2c, in turn, shows a third user modified screen layout. Here, the user generally preserves the FIG. 2b topology, but does invert the right hand column circular icon/pyramid icon relationship.

Figure 2D:
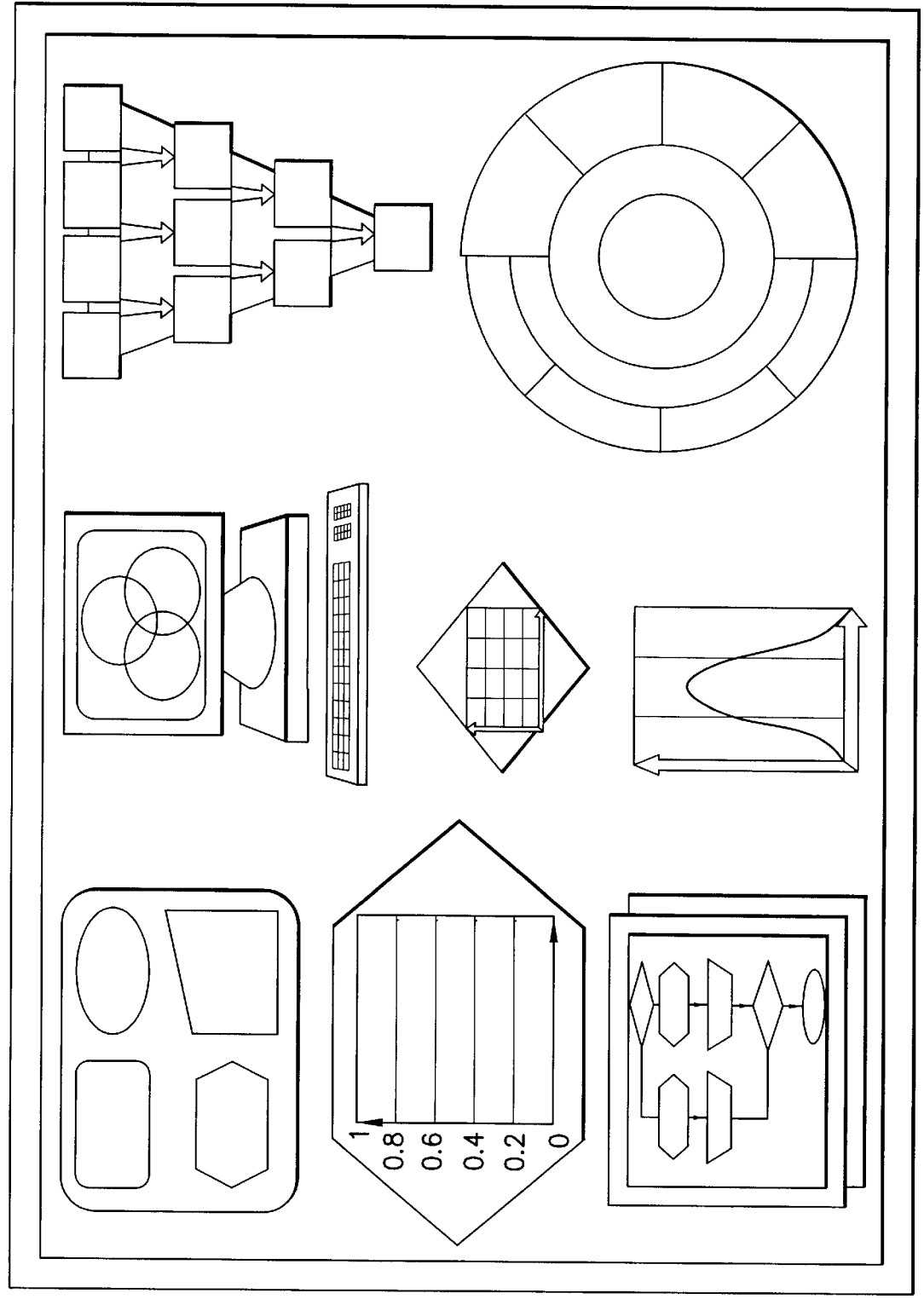

FIG. 2d shows a fourth user modified screen layout. Here, the user preserves invariant most of the FIG. 2c changes, but changes the topological arrangement of the middle column Gaussian curve-Cartesian grid duple, so that they are spaced one on top of the other, instead of side to side.

Finally, FIG. 2e, numeral 22, shows a computer modified screen layout that can be presented to the user upon instantiation of a second operating session. Note, firstly, the fact that FIG. 2e is qualitatively distinct from the default FIG. 1A screen, since it reflects and is responsive to changes manifest by the user over the first operating session (i.e., FIGS. 2a–d). Thus, for example, FIG. 2e includes the FIG. 2a circular icon (absent from the FIG. 1A default screen); and, shows the preferred (FIGS. 2b, c, d) topology of left/right column icons (namely, to the left). Further, the FIG. 2e screen layout may be differentiated from the last user screen (FIG. 2d), since FIG. 2e shows a statistically preferred Gaussian curve-Cartesian grid topology (developed in FIGS. 2b, c) that outweighs the last user preference (FIG. 2d); so that FIG. 2e (like FIGS. 2b and c), and unlike FIG. 2d, shows the Gaussian curve-Cartesian grid located side by side (and not top to bottom).

Figure 3:
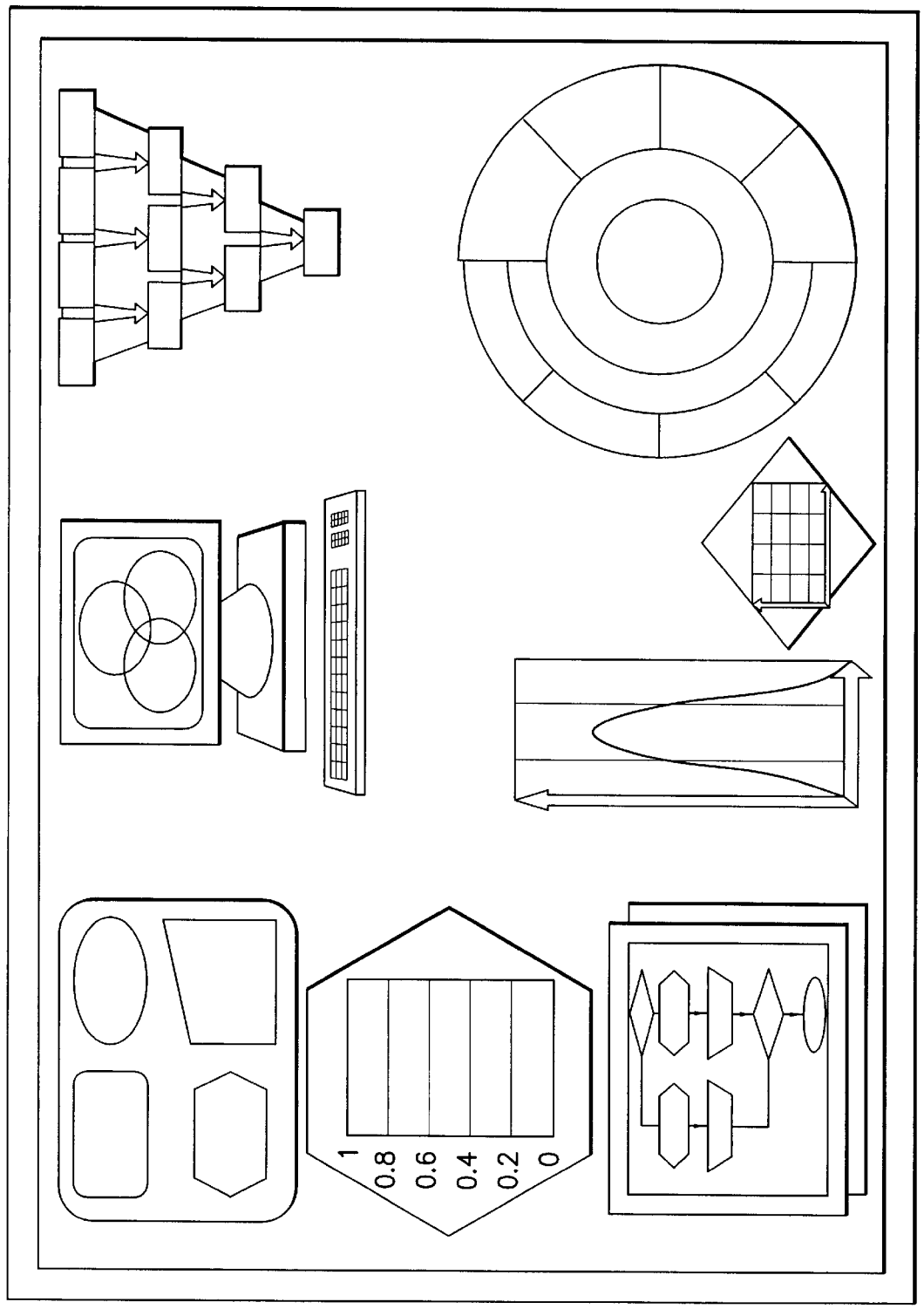
FIG. 3 shows a computer generated instant window for display during a second operating session in realization of the first operational aspect of the present invention, which instant window has been adaptively modified from the FIG. 1A default condition window so that its properties correlate to the user's specific window activity pattern developed over the first operating session, as shown in FIG. 2E, and as further enhanced by human factor rule input of the type shown in FIG. 1B.

Attention is now directed to FIG. 3, numeral 24, which shows a computer generated instant window for display during a second operating session: generated in realization of the first operational aspect of the present invention. In particular, the FIG. 3 instant window is to be critically differentiated or distinguished from FIG. 2E; this, in the following way.

FIG. 3 has been both adaptively modified from the FIG. 1A default condition window so that its properties correlate to a first referent comprising user specific window activity developed over the first operating session (e.g., FIGS. A–D), and, again, modified in turn from the FIG. 2E display by way of subjecting this first referent to constraints imposed by a second referent comprising human factor rules (e.g., FIG. 1B scaling, location, etc.) which are pertinent to a property of the FIG. 2E window.

Figure 1B:
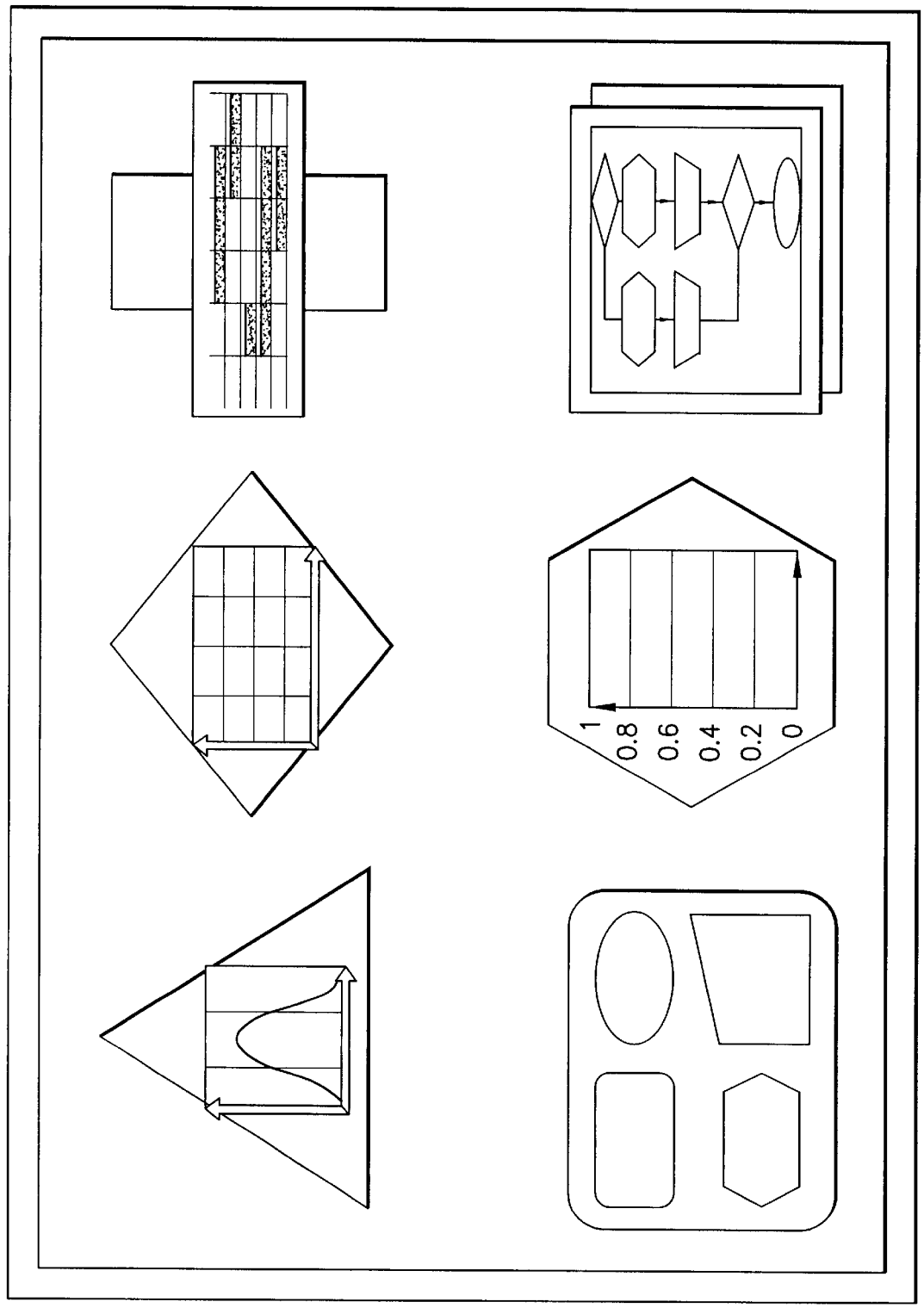

Accordingly, a modified referent has been generated for creating an instant window (FIG. 3) for display during a second operating session, which instant window has been adaptively modified from the FIG. 1A default condition window so that its properties correlate to the user's specific window activity pattern (e.g., FIGS. 2A–D) and the pertinent human factor rules (e.g., FIG. 1B).

Second Operational Aspect of the Invention

We now turn our attention to a detailed discussion of the second operational aspect of the present invention. It is recalled that this second operational aspect is of the type, albeit related to the first operational aspect, but wherein a human factor screen is primary with respect to user window activity, in determination of a window to be displayed to a user during a second operating session. To this end, we invoke FIGS. 4A–F and FIG. 5 (numerals 26–38).

In particular, FIG. 4A shows an initial default screen layout 26, while FIG. 4B shows the FIG. 4A default screen modified by a human factor rule determinant (say of the type shown in FIG. 1B), thereby creating a second referent. FIGS. 4C, D, E, and F, in turn, show sequential user modifications (of the type, say, shown in FIGS. 2A, B, C, D), to the FIG. 4B human factor modified screen layout, thus creating a first referent.

The invention now requires creating a modified referent by an action comprising subjecting the second referent to constraints imposed by the first referent developed as a reflection of the pertinent (FIG. 4B) human factor rules utilized during the first operating session. This action, accordingly, generates an instant window (FIG. 5), which instant window has been adaptively modified from the default condition window (FIG. 4A), so that its properties correlate to the user's specific window activity pattern (FIGS. 4C–F) and the pertinent human factor rules (FIG. 4B).

We now turn our attention to FIG. 6, numerals 40–62, which provides a flow chart for realization of the invention in both its first and second operational aspects or modes. Typical operation can proceed as follows.

1. User starts a new session. A default screen comes up and displays current system estimate of the windows pattern desired by the user. This may be ordered in frequency-of-use decreasing order.
2. User modifies the window pattern according to his/her current desires. The invention keeps track of user activities.
3. User selects and modifies the content of one or more windows. The invention monitors user activity in window content.
4. When done, the user can press a Save button, to save the screen and start a new application, or simply switch to a new application, in which case the invention will be responsible for analysis and presentation of the preferred windows pattern when a new session for this application is initiated.
5. The computer analyzes the user historical changes and human factor rules.
6. The computer generates an optimum resultant layout with constraints.
7. The computer displays this layout during a second operating session.

Instead of generating new patterns, the user can recall stored patterns and execute them, or set up to automatically recall and execute stored queries (e.g., for daily or weekly activities). This may be performed via a menu system.

Note that all these capabilities exist within a minimum number of screens, in a very easy-to-use and intuitive fashion. The user need not know or have to wade through several layers of windows and dialog boxes to achieve his or her goals.

As an integral, important capability, the display format may be automatically changed by the computer. The computer keeps a frequency-of-use file for each action specified by the user and its associated displays. This usage frequency preferably is maintained over several sessions, thereby constructing a moving average of usage frequency and therefore determining the actions' measure of importance.

All actions/items with a measure greater than a user selected threshold may be selected automatically for primary display, and may be displayed on a minimum number of screens on a cell by cell basis, according to their priorities.

For example, FIG. 2e, as discussed, is the result of user modifications of the FIG. 1A initial screen layout presented to the user for this application at the start of this session. Therefore, the lower rated displays are relegated to secondary screens. The computer automatically superimposes a grid on its screen, thereby partitioning the screen into display cells. A placement of these selected displays, on the basis of usage frequency, is generated, resulting in optimal layout for each user's specific activity pattern.

FIG. 7c shows a feedback control circuit that heuristically represents one way of conceptualizing the present invention, and is usefully contrasted to the FIG. 7a, b prior art heuristic control circuits.

It is to be understood that the present invention can be implemented using a plurality of separate dedicated or programmable integrated or other electronic circuits or devices (e.g., hardwired electronic or logic circuits such as discrete element circuits, or programmable logic devices such as PLDs, PLAs, PALs, or the like). A suitably programmed general purpose computer, e.g., a microprocessor, microcontroller or other processor device (CPU or MPU), either alone or in conjunction with one or more peripheral (e.g., integrated circuit) data and signal processing devices can be used to implement the invention. In general, any device or assembly of devices on which a finite state machine is capable of implementing the flow chart shown in FIG. 6, can be used as a controller with the invention.

What is claimed:

1. A computer operated method for providing an adaptive computer screen window display that accommodates user or human factor input comprising the steps of:
   (1) ascertaining a property of a window to be displayed on a computer screen in a default condition during a first operating session;
   (2) monitoring property changes prompted by inputs by a user to effect changes from the default condition of the window, thereby automatically saving a history of a user's specific window activity pattern developed during the first operating session;
   (3) creating a first referent comprising the history of the step (2) user's specific window activity pattern;
   (4) creating a second referent comprising human factor rules which are pertinent to a property of a window;
   (5) creating a modified referent by actions comprising at least one of:
      a) subjecting the first referent to constraints imposed by the second referent developed as a reflection of said step (2) user's specific window activity pattern during the first operating session;
      b) subjecting the second referent to constraints imposed by the first referent developed as a reflection of said pertinent human factor rules during the first operating session; and
      c) simultaneously optimizing said first and second referents; and
   (6) using the modified referent for generating an instant window for display during a second operating session, which instant window has been adaptively modified from the default condition so that its properties correlate to said step (2) user's specific window activity pattern and the pertinent human factor rules.

2. A method according to claim 1, wherein step (1) comprises ascertaining the status of the default condition by registering at least one of font, color, location, shape, and content of the default window.

3. A method according to claim 1, wherein step (2) comprises monitoring property changes prompted by the user throughout the entire first operating session.

4. A method according to claim 1, wherein step (3) comprises creating the first referent by determining frequency-of-use of said step (2) user's specific window activity during the first operating session.

5. A method according to claim 1, wherein step (3) comprises creating the first referent by computing the maximum likelihood expected values for the properties of said step (2) user's specific window activity during the first operating session.

6. A method according to claim 1, wherein step (3) comprises creating the first referent by using the last pattern displayed by the user in that application.

7. A method according to claim 1, wherein step (3) comprises creating the first referent comprising the history of said step (2) user's specific window activity pattern developed over several operating sessions.

8. A method according to claim 1, wherein step (4) comprises creating the second referent by optimizing a screen layout utilizing optimization via human factor rules using a method of Lagrangian multipliers for handling the constraints imposed by said step (2) user's specific window activity pattern.

9. A program storage device readable by machine, tangibly embodying a program of instructions executable by the machine to perform method steps for providing an adaptive computer screen window display that accommodates user or human factor input, the method comprising the steps of:
  (1) ascertaining a property of a window to be displayed on a computer screen in a default condition during a first operating session;
  (2) monitoring property changes prompted by inputs by a user to effect changes from the default condition of the window, thereby automatically saving a history of a user's specific window activity pattern developed during the first operating session;
  (3) creating a first referent comprising the history of the step (2) user's specific window activity pattern;
  (4) creating a second referent comprising human factor rules which are pertinent to a property of a window;
  (5) creating a modified referent by actions comprising at least one of:
    a) subjecting the first referent to constraints imposed by the second referent developed as a reflection of said step (2) user's specific window activity pattern during the first operating session;
    b) subjecting the second referent to constraints imposed by the first referent developed as a reflection of said pertinent human factor rules during the first operating session; and
    c) simultaneously optimizing said first and second referents; and
  (6) using the modified referent for generating an instant window for display during a second operating session, which instant window has been adaptively modified from the default condition so that its properties correlate to said step (2) user's specific window activity pattern and the pertinent human factor rules.

10. A computer system suitable for providing an adaptive computer screen window display that accommodates user or human factor input, the system comprising:
  (1) CPU means for ascertaining a property of a window to be displayed on a computer screen in a default condition during a first operating session;
  (2) CPU means for monitoring property changes prompted by inputs by a user to effect changes from the default condition of the window to automatically save a history of a user's specific window activity pattern during the first operating session;
  (3) CPU means for creating a first referent comprising the history of the user's specific window activity pattern;
  (4) CPU means for creating a second referent comprising human factor rules which are pertinent to a property of a window;
  (5) CPU means for creating a modified referent by actions comprising at least one of:
    a) subjecting the first referent to constraints imposed by the second referent developed as a reflection of said user's specific window activity pattern during the first operating session;
    b) subjecting the second referent to constraints imposed by the first referent developed as a reflection of said pertinent human factor rules during the first operating session; and
    c) simultaneously optimizing said first and second referents; and
  (6) CPU means for using the modified referent for generating an instant window for display during a second operating session, which instant window has been adaptively modified from the default condition so that its properties correlate to said user's specific window activity pattern and the pertinent human factor rules.

* * * * *